(12) United States Patent
Ekden

(10) Patent No.: US 10,335,861 B2
(45) Date of Patent: Jul. 2, 2019

(54) DOUBLE-SIDED, INDEXABLE TURNING INSERT AND TURNING TOOL

(71) Applicant: SECO TOOLS AB, Fagersta (SE)

(72) Inventor: Dan Ekden, Jonkoping (SE)

(73) Assignee: SECO TOOLS AB, Fagersta (SE)

( * ) Notice: Subject to any disclaimer, the term of this patent is extended or adjusted under 35 U.S.C. 154(b) by 102 days.

(21) Appl. No.: 15/517,588

(22) PCT Filed: Sep. 24, 2015

(86) PCT No.: PCT/EP2015/071933
§ 371 (c)(1),
(2) Date: Apr. 7, 2017

(87) PCT Pub. No.: WO2016/055276
PCT Pub. Date: Apr. 14, 2016

(65) Prior Publication Data
US 2017/0297115 A1    Oct. 19, 2017

(30) Foreign Application Priority Data
Oct. 9, 2014   (EP) .................................. 14188324

(51) Int. Cl.
B23B 27/16   (2006.01)
B23B 27/14   (2006.01)

(52) U.S. Cl.
CPC ............ *B23B 27/141* (2013.01); *B23B 27/16* (2013.01); *B23B 27/1603* (2013.01);
(Continued)

(58) Field of Classification Search
CPC . B23B 27/145; B23B 27/141; B23B 27/1603; B23B 27/1625; B23B 27/1607;
(Continued)

(56) References Cited

U.S. PATENT DOCUMENTS 4,056,872 A * 11/1977 Seidel .................. B23B 27/143
407/114
4,087,192 A * 5/1978 Hertel ................. B23B 27/1618
407/114
(Continued)

FOREIGN PATENT DOCUMENTS

EP        370494 A2 * 5/1990 ............... B23C 5/22
EP      2614907 A1      7/2013
(Continued)

OTHER PUBLICATIONS

Sandvik Coromont UK: "Turning Tools Catalogue 2000", Apr. 1, 2000, Sandvik Coromant UK, Halesowen, UK, XP002737508, Insert SNGA 120408 T01020; p. A28.

*Primary Examiner* — Ryan C Rufo
(74) *Attorney, Agent, or Firm* — Corinne R. Gorski

(57) ABSTRACT

Indexable, double-sided turning inserts for turning operations and and a turning tool are provided with cutting edges at alternating corners on opposite sides of the insert. Chipbreaker structures can be provided without interfering with providing large supporting surfaces. When the insert is used in a cutting operation, chips from one of the cutting edges in use are unlikely to damage cutting edges that are not in use but are on adjacent corners.

17 Claims, 4 Drawing Sheets

(52) U.S. Cl.
CPC ....... *B23B 27/1607* (2013.01); *B23B 27/1611* (2013.01); *B23B 2200/0471* (2013.01); *B23B 2200/087* (2013.01); *B23B 2200/3627* (2013.01); *B23B 2205/16* (2013.01)

(58) Field of Classification Search
CPC . B23B 27/16; B23B 27/1618; B23B 27/1648; B23B 2200/3672; B23B 2200/201; B23B 2200/3645; B23B 2200/0471; B23B 2200/0476; B23B 2200/321
See application file for complete search history.

(56) References Cited

U.S. PATENT DOCUMENTS

| | | | | |
|---|---|---|---|---|
| 5,158,401 A | * | 10/1992 | Pawlik | B23C 5/2221 407/114 |
| 5,599,141 A | * | 2/1997 | Katbi | B23B 27/143 407/114 |
| 5,921,722 A | * | 7/1999 | Paya | B23B 27/143 407/113 |
| 6,234,726 B1 | * | 5/2001 | Okada | B23B 27/143 407/114 |
| 6,241,430 B1 | * | 6/2001 | Norstrom | B23B 27/143 407/114 |
| 2004/0208713 A1 | * | 10/2004 | Duerr | B23C 5/2221 407/34 |
| 2005/0019111 A1 | * | 1/2005 | Kitagawa | B23B 27/141 407/113 |
| 2010/0296882 A1 | * | 11/2010 | Kobayashi | B23B 27/1614 407/100 |
| 2012/0170987 A1 | * | 7/2012 | Komatsuka | B23B 27/141 407/114 |
| 2012/0301234 A1 | * | 11/2012 | Yamaguchi | B23B 51/048 407/100 |
| 2014/0205388 A1 | * | 7/2014 | Hedberg | B23C 5/207 407/42 |

FOREIGN PATENT DOCUMENTS

| | | | |
|---|---|---|---|
| GB | 1419743 A | | 12/1975 |
| GB | 1467442 A | * | 3/1977 ........... B23B 27/143 |
| JP | H0569206 A | | 3/1993 |
| WO | 2006137050 A1 | | 12/2006 |
| WO | 2011121787 A1 | | 10/2011 |

* cited by examiner

DOUBLE-SIDED, INDEXABLE TURNING INSERT AND TURNING TOOL

RELATED APPLICATION DATA

This application is a § 371 National Stage Application of PCT International Application No. PCT/EP2015/071933 filed Sep. 7, 2017 claiming priority of EP Application No. 14188324.9, filed Oct. 9, 2014.

BACKGROUND AND SUMMARY

The present invention relates generally to double-sided turning inserts for turning operations and, more particularly, to indexable double-sided turning inserts for turning operations and a turning tool.

It is known to provide multiple cutting edges on cutting inserts to permit the inserts to be indexed to use a different one of the cutting edges when one becomes worn or damaged. It is also known to provide chipbreakers on cutting inserts to facilitate breaking chips that are formed from the workpiece as the cutting edge performs its cutting operation. For heavy machining operations, it is typically necessary to have large support surfaces on the insert for stability. Consequently, it is typical that an insert intended for heavy machining applications will be single sided, i.e., have all of its cutting edges on one side of the insert, while the other side of the insert will be used as a support surface. If the cutting edges on the one side of the insert are too close to one another, chips formed from the workpiece by one cutting edge in use can damage adjacent cutting edges. For example, if a single-sided insert has four cutting edges at four corners of the insert, the two cutting edges adjacent the cutting edge that is performing a cutting operation are at a particularly increased risk of being damaged. The usefulness of having chipbreakers as well as large support surfaces imposes particular limitations on the number of cutting edges that can be provided on cutting inserts for use in heavy machining operations.

It is desirable to provide an indexable double-sided turning insert with chipbreakers, large supporting surfaces, and a large number of cutting edges that can be used with a reduced risk of damage to ones of the cutting edges that are not in use.

According to an aspect of the present invention, a double-sided turning insert having a square basic shape with first and second major surfaces, and a side surface between them, comprises exactly four cutting edges proximate exactly four respective chipbreaker structures, wherein each said cutting edge and respective chipbreaker structure is located only at corner portions of the turning insert and spaced from another cutting edge, the double-sided turning insert being provided with exactly two, diagonally located cutting edges on each major surface, the major surfaces being identical but rotated 90 degrees relative to each other.

According to the aspect of the present invention, a double-sided turning insert for turning operations comprises a first major surface having a square basic shape with first, second, third, and fourth corners, a second major surface having a square basic shape with first, second, third, and fourth corners, and a side surface between the first major surface and the second major surface, the side surface including first, second, third, and fourth corners between the first, second, third, and fourth corners of the first major surface and the first, second, third, and fourth corners of the second major surface, respectively, and first, second, third, and fourth side surface portions, each side surface portion of the first, second, third, and fourth side surface portions being disposed between a respective pair of the first, second, third, and fourth corners. A plane of the first major surface and a plane of the second major surface are parallel and are perpendicular to the side surface, the insert comprises first, second, third, and fourth cutting edges and first, second, third, and fourth non-cutting edges, the first cutting edge is formed by the first corner of the first major surface and first corner of the side surface, the second cutting edge is formed by the second corner of the second major surface and the second corner of the side surface, the third cutting edge is formed by the third corner of the first major surface and the third corner of the side surface, and the fourth cutting edge is formed by the fourth corner of the second major surface and the fourth corner of the side surface, and the first non-cutting edge is formed by the first corner of the second major surface and first corner of the side surface, the second non-cutting edge is formed by the second corner of the first major surface and the second corner of the side surface, the third non-cutting edge is formed by the third corner of the second major surface and the third corner of the side surface, and the fourth non-cutting edge is formed by the fourth corner of the first major surface and the fourth corner of the side surface.

According to another aspect of the present invention, a turning tool comprises a toolholder having a pocket and fastening means, a square and flat shim mounted in the pocket, said pocket having upstanding walls defining a bisector, a square and double-sided turning insert having chipbreaker structures and support surfaces on major surfaces thereof, the square turning insert being held against the flat shim by the fastening means, wherein the turning insert is provided with cutting edges only at alternating corners on opposite major surfaces, each chipbreaker structure at a major surface in contact with the flat shim is provided distant from the bisector.

With such an insert and tool it is possible to provide a sturdy indexable insert with four cutting edges that can each perform a turning operation with minimal risk of damage to the cutting edges that are not in use.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
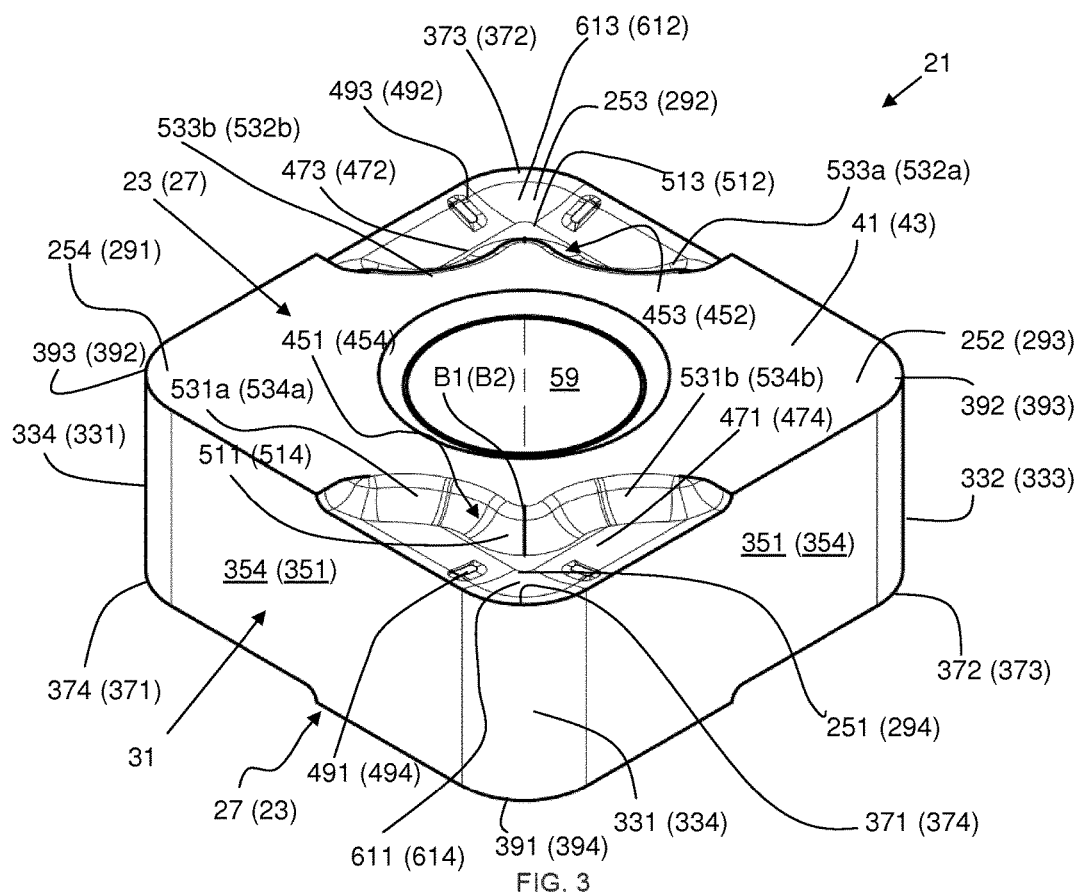
FIG. 1 is a perspective view of a double-sided turning insert according to an aspect of the present invention.

A double-sided turning insert 21 that is particularly useful for turning operations is shown in FIG. 1 and includes a first surface or first major surface 23 having a square basic shape with first, second, third, and fourth corners 251, 252, 253, 254. The definition of a square basic shape is a shape with four sides of equal length. The insert 21 also includes a second surface or second major surface 27 having a square basic shape with first, second, third, and fourth corners 291, 292, 293, 294. The second major surface 27 is identical to the first major surface 23 but rotated 90° along for example a plane depicted by the imaginary midline M in FIG. 6A. In this way, a double-sided turning insert with four cutting corners can be provided that is particularly useful in heavy machining with reduced risk of chips from a workpiece damaging an adjacent corner of the insert and thereby ruining the economic benefit of the four corners. The reference numbers shown in parentheses in FIG. 1 reflect the positions of the features identified by those reference numbers if the insert were turned over from the position shown, i.e., flipped 180° about a diagonal axis D1 or D2.

A side or clearance surface 31 is disposed between the first major surface 23 and the second major surface 27. The major surfaces 23, 27 may each be perpendicular to the side surface 31. The side surface 31 includes first, second, third, and fourth corners 331, 332, 333, 334 between the first, second, third, and fourth corners 251, 252, 253, 254 of the first major surface 23 and the first, second, third, and fourth corners 291, 292, 293, 294 of the second major surface 27, respectively. The side surface 31 also includes first, second, third, and fourth side surface portions 351, 352, 353, 354. Each side surface portion of the first, second, third, and fourth side surface portions 351, 352, 353, 354 is disposed between a respective pair of the first, second, third, and fourth corners 291, 292, 293, 294 of the side surface 31.

Figure 2:
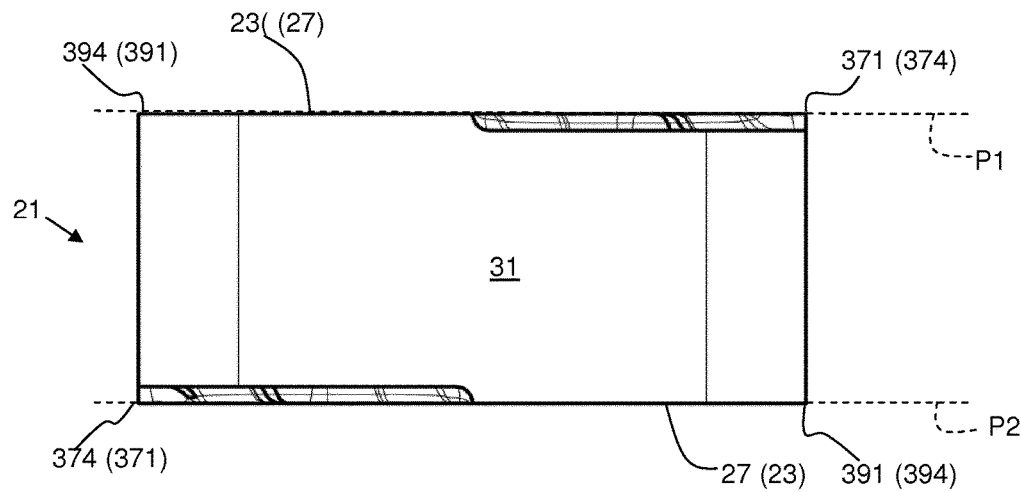
FIG. 2 is a side view of the double-sided turning insert of FIG. 1.

As seen in FIG. 2, a plane P1 of the first major surface 23 and a plane P2 of the second major surface 27 are parallel and are perpendicular to the side surface 31.

Figure 3:
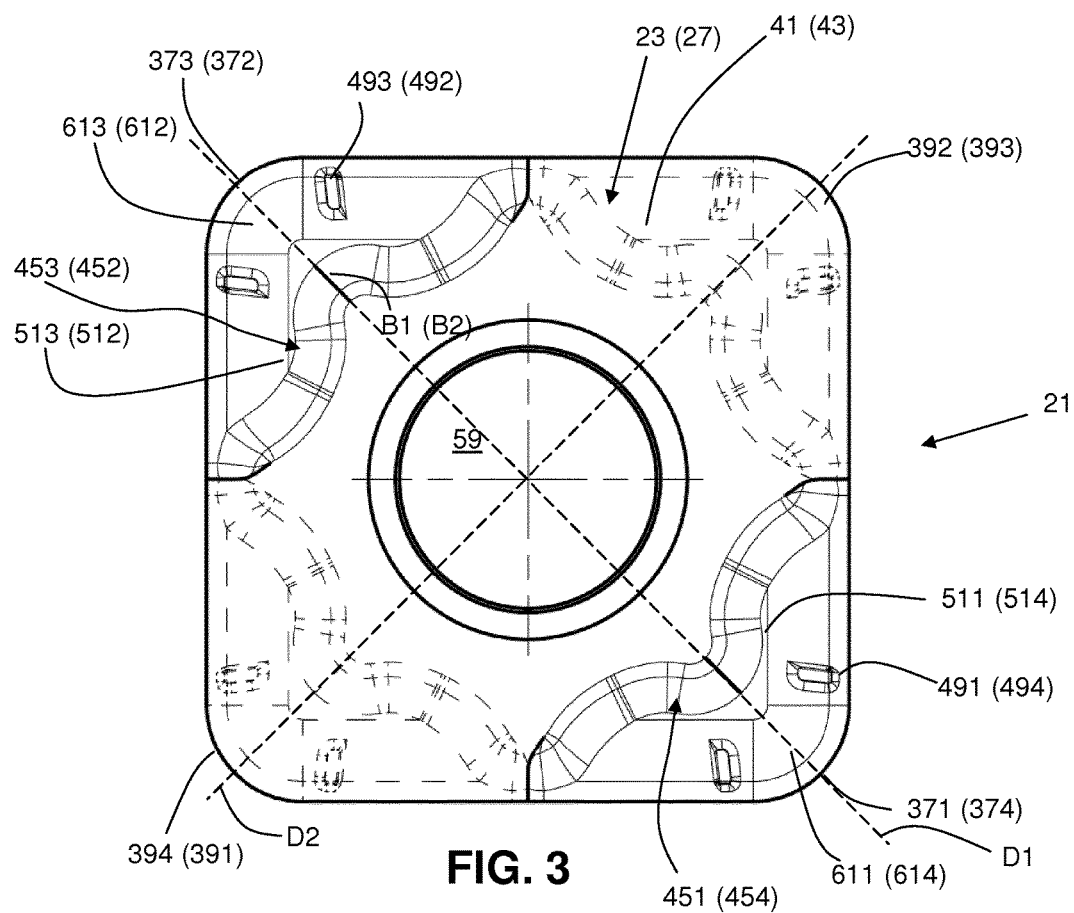
FIG. 3 is a top view of the double-sided turning insert of FIG. 1.

Referring to FIGS. 1 and 3, the insert 21 comprises first, second, third, and fourth cutting edges 371, 372, 373, 374 and first, second, third, and fourth non-cutting edges 391, 392, 393, 394. A non-cutting edge or non-cutting corner does not have a chip-breaking structure located proximate thereto.

The first cutting edge 371 is formed by at least the first corner 251 of the first major surface 23 and first corner 331 of the side surface 31. The second cutting edge 372 is formed by at least the second corner 292 of the second major surface 27 and the second corner 332 of the side surface 31. The third cutting edge 373 is formed by at least the third corner 253 of the first major surface 23 and the third corner 333 of the side surface 31. The fourth cutting edge 374 is formed by at least the fourth corner 294 of the second major surface 27 and the fourth corner 334 of the side surface 31. The first, second, third, and fourth cutting edges will ordinarily extend past the corners with which they are associated as seen with respect to the cutting edges 1371, 1372, 1373, and 1374 in FIG. 4B and the cutting edges 2371, 2372, 2373, and 2374 in FIG. 5B.

The first non-cutting edge 391 is formed by the first corner 291 of the second major surface 27 and first corner 331 of the side surface 31. The second non-cutting edge 392 is formed by the second corner 252 of the first major surface 23 and the second corner 332 of the side surface 31. The third non-cutting edge 393 is formed by the third corner 293 of the second major surface 27 and the third corner 333 of the side surface 31. The fourth non-cutting edge 394 is formed by the fourth corner 254 of the first major surface 23 and the fourth corner 334 of the side surface 31.

The first major surface 23 ordinarily comprises a first support surface 41 and the second major surface 27 ordinarily comprises a second support surface 43. As illustrated, the first and second support surfaces 41 and 43 can be planar surfaces. The first and second support surfaces 41 and 43 may not reach the associated cutting edges 371, 372, 373, 374 at the cutting corners 251, 292, 253, 294. The insert 21 can be provided with support surfaces of substantial size, which can facilitate providing enhanced stability. The side surface portions 351, 352, 353, 354 typically also function as support surfaces for the insert 21 and can be of substantial size to enhance stability.

As seen in FIGS. 1 and 2, the first cutting edge 371 and the third cutting edge 373 can be disposed below the first support surface 41 in a direction toward the second support surface 43. The second cutting edge 372 and the fourth cutting edge 374 can be disposed below the second support surface 43 in a direction toward the first support surface 41.

The insert 21 can comprise chipbreaker structures 451, 452, 453, 454 between the first cutting edge 371 and the first support surface 41, the second cutting edge 372 and the second support surface 43, the third cutting edge 373 and the first support surface, and the fourth cutting edge 374 and the second support surface. The chipbreaker structures 451, 452, 453, 454 between the cutting edges and the support surfaces can be in the form of a ridge or ridges rising from surfaces 471, 472, 473, 474 inward of the first, second, third, and fourth cutting edges 371, 372, 373, 374.

The chipbreaker structure may be symmetrical in top view relative to a diagonal axis D1, D2 of the insert (FIG. 3).

Additional chipbreaker structures 491, 492, 493, 494 can also or alternatively be provided proximate the first, second, third, and fourth cutting edges 371, 372, 373, 374. The additional chipbreaker structures 491, 492, 493, 494 can be in the form of one or more protrusions proximate respective ones of the first, second, third, and fourth cutting edges 371, 372, 373, 374.

Ridges of the chipbreaker structures 451, 452, 453, 455 can include convex curved portions 511, 512, 513, 514, respectively, centered on bisectors B1 and B2 between the first and third cutting edges and between the second and fourth cutting edges. The ridges can also include concave portions 531a, 531b, 532a, 532b, 533a, 533b, 534a, 534b on opposite sides of the bisectors B1 and B2.

Because the cutting edges 371, 372, 373, 374 are provided at alternating corners 251, 292, 253, 294 on opposite sides 23 and 27 of the insert, the chipbreaker structures can be provided without interfering with providing large supporting surfaces 41 and 43. In addition, when the insert 21 is used in a cutting operation, chips from one of the cutting edges 371, 372, 373, 374 in use are unlikely to damage cutting edges that are not in use but are on adjacent corners.

Figure 4A:
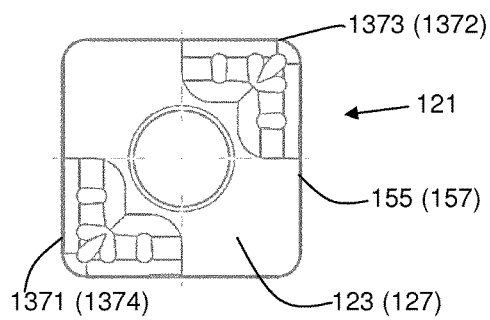
FIG. 4A is a top view of a double-sided turning insert according to an aspect of the present invention.
Figure 4B:
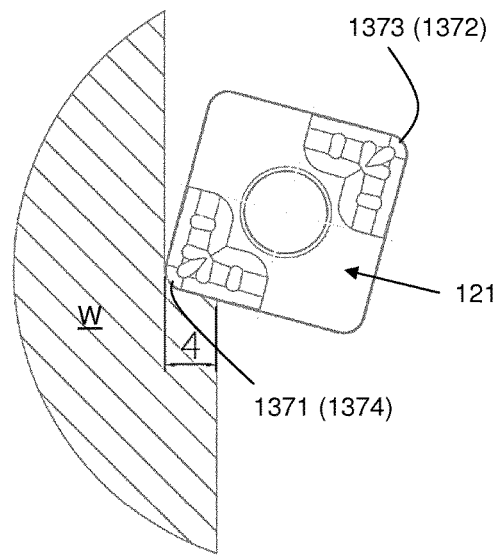
FIG. 4B is a top view of the double-sided turning insert of FIG. 4A performing a cutting operation.

In one form of insert 121 according to an aspect of the present invention seen in FIGS. 4A and 4B, the first and third cutting edges 1371 and 1373 each comprise no more than one quarter of a total length of a first edge 155 formed by the first major surface 123 and the side surface, and the second and fourth cutting edges 1372 and 1374 each comprise no more than one quarter of a total length of a second edge 157 formed by the second major surface 127 and the side surface. FIG. 4B shows the insert 121 performing a cutting operation on a workpiece W.

Figure 5A:
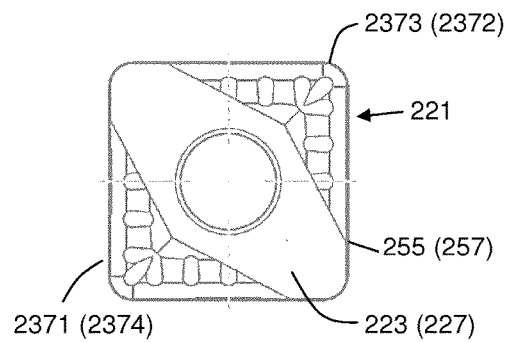
FIG. 5A is a top view of a double-sided turning insert according to an aspect of the present invention.
Figure 5B:
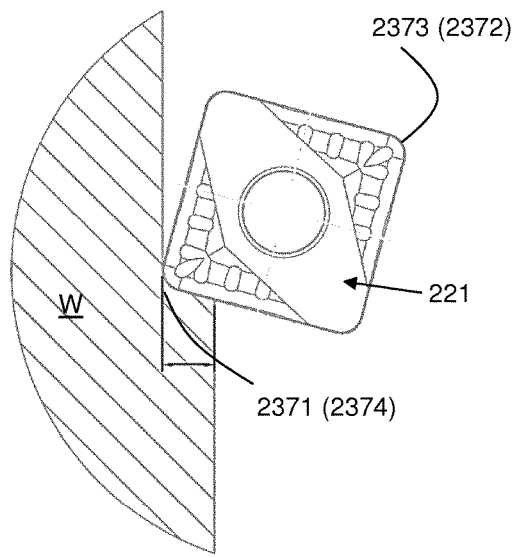
FIG. 5B is a top view of the double-sided turning insert of FIG. 5A performing a cutting operation.

In another form of insert 221 according to another aspect of the present invention seen in FIGS. 5A and 5B, the first and third cutting edges 2371 and 2373 each comprise more than one quarter of a total length of a first edge 255 formed by the first major surface 223 and the side surface, and the second and fourth cutting edges 2372 and 2374 each comprise more than one quarter of a total length of a second edge formed by the second major surface 227 and the side surface. FIG. 5B shows the insert 221 performing a cutting operation on a workpiece W.

In all of the illustrated double-sided turning inserts 21, 121, and 221, a turning insert with four cutting corners is provided that is particularly useful in heavy machining with reduced risk of chips from a workpiece damaging an adjacent corner of the insert and thereby ruining the economic benefit of the four corners. As seen in FIGS. 4B and 5B, for example, chips formed by the cutting corners 1371 or 1374 in FIG. 4B or cutting corners 2371 or 2374 in FIG. 5B are unlikely to damage the cutting corners 1373 or 1372, respectively, in FIG. 4B or 2373 or 2372, respectively, in FIG. 5B.

As seen in FIGS. 1-3, a through hole 59 can extend between the first major surface 23 and the second major surface 27 and can be used to secure the insert to a toolholder (FIGS. 6A-6C), such as by a bolt or screw. First, second, third and fourth rake surfaces 611, 612, 613, 614 inward of the first, second, third, and fourth cutting edges 371, 372, 373, 374 can define acute angles with the side surface 31 if a sharper cutting edge is desired.

Stated another way, the double-sided turning insert 21, 121, 221 has a square, preferably negative, basic shape with first and second major surfaces 23, 123, 223, 27, 127, 227 and a side surface 31 between them. The insert has exactly four cutting edges. Each cutting edge is located only at corner portions of the turning insert and spaced from another cutting edge. The double-sided turning insert 21 is provided with exactly two, diagonally located cutting edges 371, 372, 373, 374; 1371, 1372, 1373, 1374; 2371, 2372, 2373, 2374 on each major surface. The major surfaces 23, 27, are identical but rotated 90 degrees relative to each other, as seen in FIG. 3. Each cutting edge 371, 372, 373, 374; 1371, 1372, 1373, 1374; 2371, 2372, 2373, 2374 may be formed at an intersection of a corner 251, 253, 292, 294 of a major surface and the side surface 31.

Figure 6A:
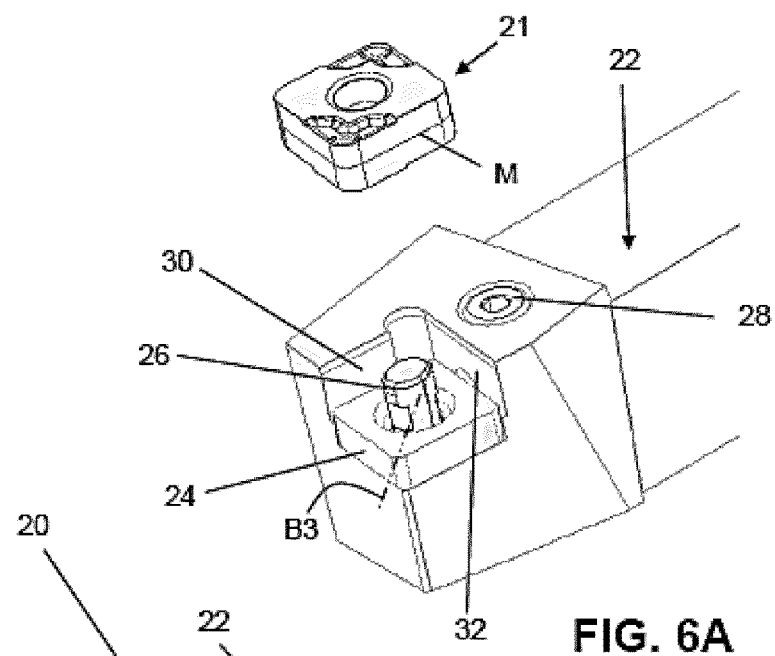
FIG. 6A is a perspective, exploded view of the double-sided turning insert according to FIGS. 1-3 and a toolholder.
Figure 6B:
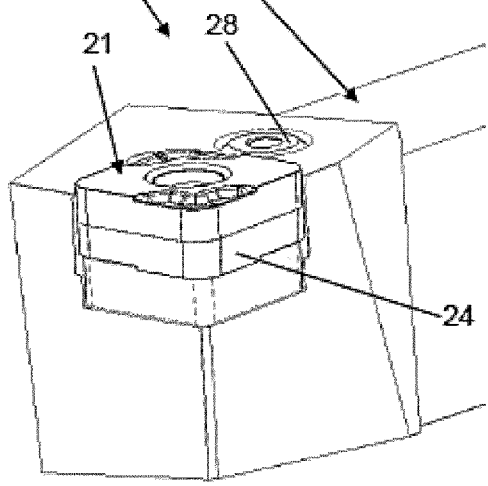
FIG. 6B is a perspective view of the double-sided turning insert mounted to the toolholder.
Figure 6C:
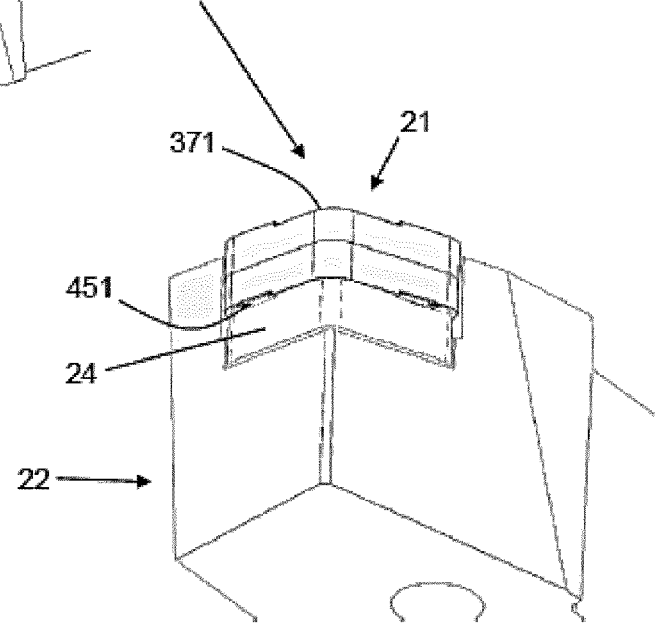
FIG. 6C is a perspective view from below of the double-sided turning insert mounted to the toolholder.

A turning tool 20 comprising a double-sided turning insert 21 according to FIGS. 1-3 is shown in FIGS. 6A-6C. The turning tool comprises a conventional toolholder 22 having a pocket and fastening means, in this case a lever pin 26 manipulated via a screw 28. A square, flat shim 24 is mounted in the pocket. The pocket has upstanding walls 30, 32 defining a bisector B3. The upstanding walls may support the inactive clearance surfaces 31 of the turning insert. The square turning insert can be anyone of the inserts 21, 121, 221 and has chipbreaker structures 451, 452, 453, 454 and support surfaces 41, 43 on major surfaces 23, 27 thereof. The square turning insert is held against the flat shim by the fastening means. The turning insert 21 is provided with cutting edges 371 only at alternating corners on opposite major surfaces 23, 27. Each, preferably symmetrical, chipbreaker structure 451, 452, 453, 454 at a major surface in contact with the flat shim is provided distant from the bisector B3.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such. The term "major" refers to sizes, areas, lengths, etc. and the expression "square basic shape" is best illustrated by FIG. 3 as perceived by the skilled person.

While this invention has been illustrated and described in accordance with a preferred embodiment, it is recognized that variations and changes may be made therein without departing from the invention as set forth in the claims.

The disclosures in EP Patent Application No. 14188324.9, from which this application claims priority, are incorporated herein by reference.

The invention claimed is:

1. A double-sided turning insert comprising:
   a square basic shape with first and second major surfaces;
   a side surface disposed between the first and second major surfaces;
   exactly four cutting edges proximate exactly four respective chipbreaker structures, wherein each cutting edge of the exactly four cutting edges and a respective chipbreaker structure of each of the exactly four cutting edges is located at corner portions of the turning insert and spaced from another cutting edge of the exactly four cutting edges;
   exactly two of the exactly four cutting edges are diagonally opposed and located on each major surface, wherein the major surfaces are identical but rotated 90 degrees relative to each other,
   wherein the first major surface includes a first support surface and the second major surface includes a second support surface, the first support surface and the second support surface extending to the side surface; and
   wherein a plane of the first major surface contains the first support surface and a plane of the second major surface contains the second support surface, the exactly four cutting edges are recessed relative to the respective plane of the first and second major surfaces.

2. The double-sided turning insert as set forth in claim 1, wherein each cutting edge of the exactly four cutting edges is formed at an intersection of a corner of one of the first and second major surfaces and the side surface, each of the first and second major surfaces being perpendicular to the side surface.

3. The double-sided turning insert as set forth in claim 1, wherein the first major surface has a square basic shape with first, second, third, and fourth corners, the second major surface has a square basic shape with first, second, third, and fourth corners, the side surface being disposed between the first major surface and the second major surface, the side surface including first, second, third, and fourth corners between the first, second, third, and fourth corners of the first major surface and the first, second, third, and fourth corners of the second major surface, respectively, and the side surface including first, second, third, and fourth side surface portions, each side surface portion of the first, second, third, and fourth side surface portions being disposed between a respective pair of the first, second, third, and fourth corners of the side surface, wherein the plane containing the first major surface and the plane containing the second major surface are parallel and are perpendicular to the side surface.

4. The double-sided turning insert as set forth in claim 1, wherein the first and second support surfaces are planar surfaces.

5. The double-sided turning insert the insert as set forth in claim 3, further comprising first, second, third, and fourth cutting edges of the exactly four cutting edges, and first, second, third, and fourth non-cutting edges, wherein the first cutting edge is formed by at least the first corner of the first major surface and the first corner of the side surface, the second cutting edge is formed by at least the second corner of the second major surface and the second corner of the side surface, the third cutting edge is formed by at least the third corner of the first major surface and the third corner of the side surface, and the fourth cutting edge is formed by at least the fourth corner of the second major surface and the fourth corner of the side surface.

6. The double-sided turning insert the insert as set forth in claim 5, wherein the first non-cutting edge is formed by the first corner of the second major surface and the first corner of the side surface, the second non-cutting edge is formed by the second corner of the first major surface and the second corner of the side surface, the third non-cutting edge is formed by the third corner of the second major surface and the third corner of the side surface, and the fourth non-cutting edge is formed by the fourth corner of the first major surface and the fourth corner of the side surface.

7. The double-sided turning insert as set forth in claim 5, wherein the first cutting edge and the third cutting edge are disposed below the first support surface in a direction toward the second support surface, and the second cutting edge and the fourth cutting edge are disposed below the second support surface in a direction toward the first support surface.

8. The double-sided turning insert as set forth in claim 5, wherein one of the respective chipbreaker structures of each of the exactly four cutting edges is disposed, respectively, between the first cutting edge and the first support surface, the second cutting edge and the second support surface, the third cutting edge and the first support surface, and the fourth cutting edge and the second support surface.

9. The double-sided turning insert as set forth in claim 5, wherein each of the respective chipbreaker structures of each of the exactly four cutting edges has one or more protrusions proximate respective ones of the first, second, third, and fourth cutting edges.

10. The double-sided turning insert as set forth in claim 5, wherein each of the respective chipbreaker structures of each of the exactly four cutting edges has ridges proximate respective ones of the first, second, third, and fourth cutting edges.

11. The double-sided turning insert as set forth in claim 10, wherein the ridges include convex curved portions centered on bisectors between the first and third cutting edges and between the second and fourth cutting edges.

12. The double-sided turning insert as set forth in claim 10, wherein the ridges include concave portions on opposite sides of the bisectors between the first and third cutting edges and between the second and fourth cutting edges.

13. The double-sided turning insert as set forth in claim 5, wherein the first and third cutting edges of the exactly four cutting edges each is no more than one quarter of a total length of a first edge formed by the first major surface and the side surface, and the second and fourth cutting edges each is no more than one quarter of a total length of a second edge formed by the second major surface and the side surface.

14. The double-sided turning insert as set forth in claim 5, wherein the first and third cutting edges of the exactly four cutting edges each is more than one quarter of a total length of a first edge formed by the first major surface and the side surface, and the second and fourth cutting edges each is more than one quarter of a total length of a second edge formed by the second major surface and the side surface.

15. The double-sided turning insert as set forth in claim 5, further comprising first, second, third, and fourth rake surfaces located inward of the first, second, third, and fourth cutting edges, the first, second, third, and fourth rake surfaces defining acute angles with the side surface.

16. The double-sided turning insert as set forth in claim 5, wherein one of the respective chipbreaker structures of each of the exactly four cutting edges is disposed, respectively, between the first cutting edge and the first support surface, the second cutting edge and the second support surface, the third cutting edge and the first support surface, and the fourth cutting edge and the second support surface, the chipbreaker structures being symmetrical relative to a diagonal axis of the insert.

17. A turning tool comprising;
a toolholder having a pocket and fastening means, a square and flat shim mounted in the pocket, said pocket having upstanding walls defining a bisector; and
the double-sided turning insert of claim 1 mounted in the pocket and held against the flat shim by the fastening means.

* * * * *